US005085477A

United States Patent [19]
Gagnon

[11] Patent Number: 5,085,477
[45] Date of Patent: Feb. 4, 1992

[54] WATER BOTTLE NECK CLAMP

[76] Inventor: Paul L. Gagnon, P.O. Box 267, Port Hueneme, Calif. 93041

[21] Appl. No.: 726,252

[22] Filed: Jul. 5, 1991

[51] Int. Cl.⁵ .......................... B65D 23/10; B65G 7/12
[52] U.S. Cl. .................................... 294/28; 294/31.1; 294/164
[58] Field of Search .................. 294/16, 27.1, 28-30, 294/31.1, 31.2, 33, 34, 87.22, 90, 104, 145, 164, 165, 167-169; 16/114 R; 215/100 A; 220/85 H, 94 R, 95, 96

[56] References Cited

U.S. PATENT DOCUMENTS

| | | |
|---|---|---|
| 1,026,788 | 5/1912 | Cope . |
| 1,151,163 | 8/1915 | Cederholm ................ 294/164 X |
| 1,198,195 | 9/1916 | Cross . |
| 1,236,610 | 8/1917 | Sherwood . |
| 1,253,903 | 1/1918 | Stevens ................... 294/27.1 X |
| 1,336,049 | 4/1920 | Rix ........................ 294/34 |
| 1,407,630 | 2/1922 | Bloomquist ............... 294/34 |
| 1,434,594 | 11/1922 | Davis . |
| 1,569,405 | 1/1926 | Sommer .................. 294/28 |
| 1,691,254 | 11/1928 | Robinson ................. 294/28 X |
| 1,711,757 | 5/1929 | Stokes . |
| 1,726,471 | 8/1929 | Cathcart . |
| 2,032,647 | 3/1936 | Andrlik . |
| 2,204,843 | 6/1940 | Campbell . |
| 2,288,358 | 6/1942 | Jenkins . |
| 2,481,923 | 9/1949 | Hall . |
| 2,534,512 | 12/1950 | Fulton . |
| 2,565,806 | 8/1951 | Fessner . |
| 2,985,330 | 5/1961 | Buys . |
| 3,037,654 | 6/1962 | Buys . |
| 3,934,772 | 1/1976 | Brannan . |
| 4,236,743 | 12/1980 | Fox . |

FOREIGN PATENT DOCUMENTS

| | | |
|---|---|---|
| 165764 | 4/1950 | Austria . |
| 134230 | 1/1952 | Sweden . |
| 477806 | 1/1938 | United Kingdom . |

Primary Examiner—Johnny D. Cherry
Attorney, Agent, or Firm—Kenneth J. Hovet

[57] ABSTRACT

A clamping device is provided that forms a preset opening for engagement with a bottle neck. A removable neck ring having a U-shape is adapted to engage a portion of the bottle neck. The ring is hingedly attached to the corner of an L-shaped lever. The lever comprises a bail with a fixed outwardly extending abutment leg which has a concave structure corresponding to a portion of the bottle neck. The leg includes flared corner portions which overlap a part of the neck ring. Rotation of the bail just past an intermediate position will cause the abutment leg to snap down against the neck ring. This results from the corner hinge orbiting from a position spaced-apart and below the area of neck/leg contact to an area above the neck/leg contact simultaneous with rotation of the lever about the neck ring hinge connection.

15 Claims, 2 Drawing Sheets

WATER BOTTLE NECK CLAMP

BACKGROUND OF THE INVENTION

1. Field of the Invention

The present invention relates to a clamping device and, more particularly, to a combined handle and clamping assembly for a water bottle.

2. Description of Related Art

A large number of bottle and jar handling devices have been developed in relation to the food industry. Such devices are designed to handle bottles and jars both during and after sterilization processes. Similar devices have evolved for handling heavy containers such as five gallon drinking water bottles. These devices are designed to enhance safety and make it easier and more convenient to move the containers which typically weigh over forty pounds.

A basic assembly for heavy bottles is shown in U.S. Pat. No. 1,434,594. There, a pair of arms is connected to an integral loop which extends over the bottle neck. As the handle is raised, the loop engages the neck and is drawn tightly thereagainst.

Other devices have opposing arms that operate like a scissor against the neck. As the handle bars are grasped, the arms are simultaneously rotated against the neck. See U.S. Pat. No. 2,534,512.

In a similar fashion, U.S. Pat. No. 1,726,471 shows a slip ring that is integral with the handles and encircles neck loop arms. As the handles are lifted, the slip ring draws the opposing loops against the neck.

A grappler type of engagement means is shown in U.S. Pat. No. 2,481,923. Half loops are described with inclined arms and handle bars. When the bars are drawn together during lifting action, the loops move toward each other and encircle the bottle neck for lifting.

A stated advantage of the above assemblies is their ability to engage a variety of neck diameters and shapes. Unfortunately, this ability necessarily requires a commensurate variety of mechanical linkages and slip mechanisms. This, in turn, creates numerous opportunities for mechanical break-down and unsafe lifting.

Also, with the above devices, it will be noted that neck engagement occurs only when the bottle is being simultaneously lifted. The heavier the bottle, the tighter the engagement. But, what if the bottle is jarred and the force of gravity is momentarily neutralized? Or what if a person wishes to simply change lifting hands or adjust the bottle position while the bottle is being temporarily supported? In such cases, the aforementioned assemblies would loosen and become totally dislodged. Or, the loop means could possibly retighten in an unsafe or unstable manner.

An example of the above hazardous assembly is shown in Austrian Patent No. 165,764. In that assembly, the lower ends of opposing handle arms are connected by a short perpendicular crosspiece. A loop is also hinged to the lower arms. When the loop is placed around a bottle neck and the bottle is lifted, the crosspiece will rotate against the neck. The bottle weight will force the crosspiece to push against the neck and draw the loop against the opposite side of the neck. Only as long as the bottle is suspended, will the loop and crosspiece be forced against the bottle neck.

The possibility of dislodgement is further exacerbated with the above assembly because the upper ends of the handle arms incline together to form an almost universal swivel joint with the handle bar. This construction allows for an almost unlimited amount of swinging, twisting or up and down spring-like motion. Any one or combination of the above motions can contribute to a hazardous loosening of the loop and crosspiece grip.

SUMMARY OF THE INVENTION

The present invention avoids the above hazards with a specified construction that affirmatively clamps onto a bottle neck without the need for bottle lifting or the force of gravity. An L-shaped lever is used in conjunction with a bottle neck ring member. The elongated part of the lever comprises a bail or handle means and the shorter leg portion comprises a bottle neck abutment means.

The neck ring is hinged to the corner of the lever and inclines downwardly and outwardly from the leg portion. The ring is placed over the bottle neck when the handle portion is disposed about horizontally in an open position. As the handle is raised toward a vertical position, the leg portion will push against the neck and create an outward force. This will draw the ring tightly against the bottle neck.

The leg portion has a predetermined radial extent and the ring is sized so that the spacing therebetween will be about equal to the neck outer diameter. The leg portion and ring geometry, along with the spacing, create a predetermined clamp opening. This occurs when the handle is about vertical and the leg portion is below its hinge axis against the bottle neck.

The neck ring or loop includes opposing pivot arms. The arms have distal ends with connector means for rotatable engagement with the lever corner. They incline downwardly below the abutment means to provide a stop means for the abutment means when it is rotated to a clamped position against the bottle neck.

Each of the pivot arms merge at an elbow with the opposing ends of the neck ring. The neck ring encircles about half the bottle neck opposite the abutment means. During the clamping step, corner portions of the abutment means rotate past a plane coextensive with the hinge axis and perpendicular to the neck axis. The rotation will continue until the corner portions rest upon the aforementioned pivot arms. During this movement, the offset hinge means will orbit upwardly about the area of contact between the abutment means and bottle neck. Simultaneously, the abutment means will pivot about the same area of contact.

Because of the close fit of the neck ring and abutment means, the elbow will flex as the abutment means moves past the perpendicular hinge axis plane. The force of such flexure will cause the hinge means to quickly orbit into an upper location above the aforementioned area of contact. In effect, the two axes of rotation and flexure force create a snap action of the lever as the abutment means moves from a position of high stress to low stress against the bottle neck.

Additionally, the neck itself and/or overlying cap may be resilient. This may function to provide a continuous force radially outward against the abutment means. Such force helps to maintain the abutment means in the offset clamped position.

From the above it can be seen that the invention is simple in construction and operation, thoroughly reliable, possessed of few parts and inexpensive to manufacture. It also provides a snap action clamping engagement of predetermined size about a bottle neck regardless of the weight or disposition of the bottle.

DESCRIPTION OF THE PREFERRED EMBODIMENTS

Figure 1:
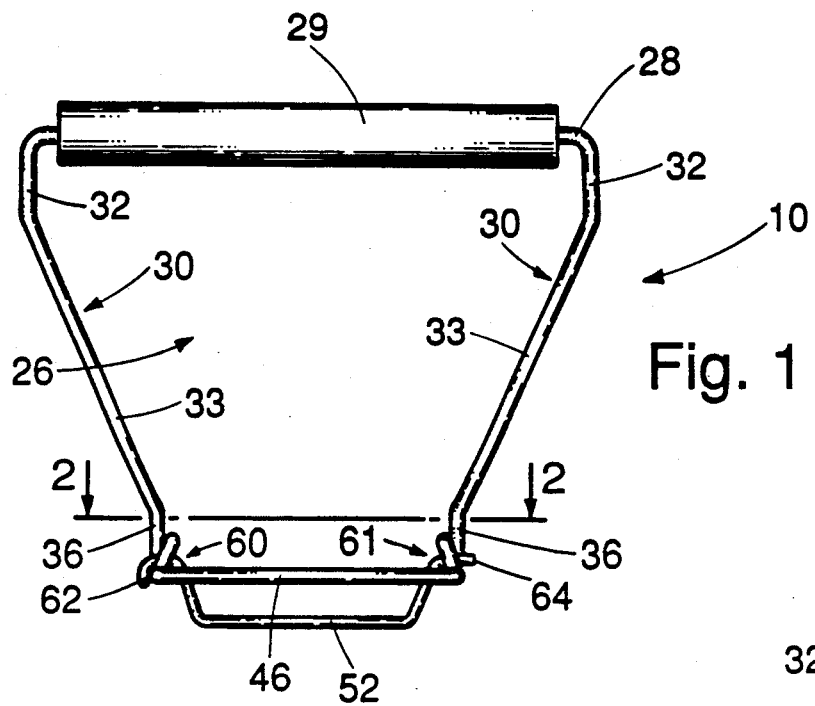
FIG. 1 is a front elevational view of the clamping device of the present invention.

With reference now to the drawings, the overall clamping device of the invention is shown by reference 10 in FIG. 1. The device comprises two separable parts which are hinged together. The first part is a lever 12 comprising a bail or handle means 14 from which extends an abutment means 16. The overall profile proximates the letter "L". The corner 19 of the L-shape includes a hinge means 18 to provide for attachment of the second part.

The second part comprises a neck engagement means 20 which is connected to the hinge means. The neck engagement means extends below and outwardly in the same direction as the abutment means. When properly dimensioned and oriented over a bottle neck 24 of predetermined size, upward rotation of the bail will cause the abutment means and engagement means to move together and form a tight preset engagement with the neck.

Both parts of the invention may be constructed from a formable rod or heavy wire. It is helpful that the lever be constructed of a stiff relatively inflexible material. This allows it to properly perform its leveraging function against the bottle neck. In such case, it can be formed out of a filled or reinforced plastic material or a metal rod which can be bent in the manner shown.

The neck engagement means is most desirably constructed of a thinner flexible material. This allows the means to flex when the abutment means rotates past a plane perpendicular to the neck axis. Such point of rotation corresponds to an intermediate position with maximum constriction force against the neck.

Subsequently, the abutment means rotates to a point of overlapping engagement with the neck engagement means. At this position, it causes little or no constrictive force.

During the clamping process, i.e., the lever rotation, the neck engagement means will flex, as aforementioned, to accommodate the varying constriction forces. This helps to give a spring-like action to the clamping movement. Also, any remaining deflection force will help to hold the lever in a down position against the neck engagement means.

Figure 2:
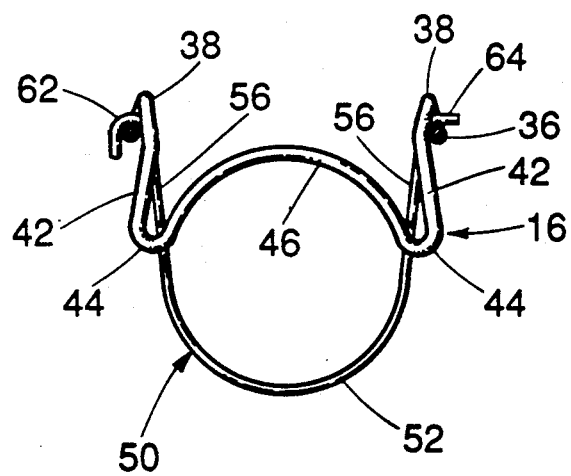
FIG. 2 is a top plan view taken along lines 2—2 of FIG.1.
Figure 3:
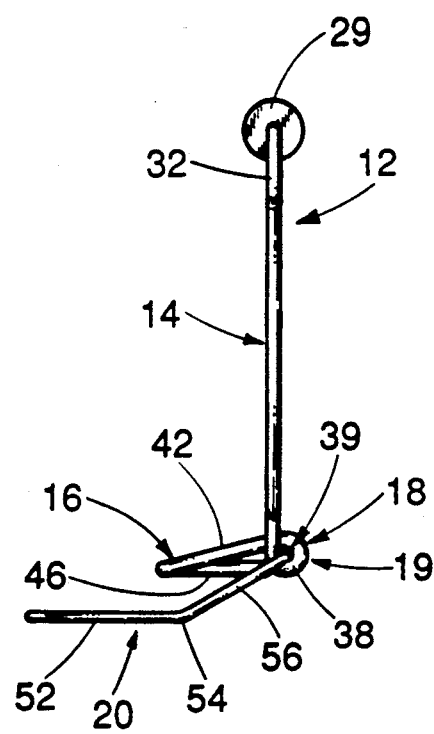
FIG. 3 is a side elevational view of the device of FIG. 1.

With reference to FIGS. 1-3, the lever 12 presents an open handle area 26 sized to permit access with one's hand. The area is defined by handle bar 28 and side arms 30. As shown in FIG. 1, the handle bar is a straight member having a length commensurate to the width of one's hand. It may include a sleeve member 29 which has an enlarged diameter to permit ease of grasping. The sleeve could also be curved or indented to facilitate a comfortable grip.

A side arm 30 extends outwardly from each opposing end of the sleeve member and immediately turns about 90 degrees downwardly to form an extender portion 32. The length of this portion proximates the thickness of one's fingers when grasped about the sleeve.

From the extender portion, each side arm comprises an elongated straight section 33 which inclines at an acute angle inwardly and downwardly to a hinge means 18. At this point the spacing between each of the arms is less than the length of the handle bar 28.

Each side arm and respective hinge means is a mirror image of the other and the overall lever is bilaterally symmetrical. Also, as best seen in FIG. 3, the handle bar and arms lie in the same plane.

The hinge means at the lower end of each arm comprises a short upright section 36 which extends downwardly and then merges into an upwardly and inwardly curled portion 38. The curled portion presents a helical segment with about a three quarter turn of the lever rod. The open center area created by the turn comprises a hinge eyelet 39.

From the curled portion, the rod continues into a concave shaped abutment means formed into a neck abutment segment by the inwardly curved merging of the mirror-image opposing rod structures. Overall, the abutment segment comprises opposing outwardly flared and slightly downwardly inclined ramp portions 42. They extend from respective helical segments to opposing outer corner portions 44.

At the corner portions, the rod turns back, preferably horizontally, and curves inward to join the opposing rod at the point of bilateral symmetry. The resulting concave structure 46 is horizontally spaced-apart from the hinge means and forms an abutment plane which is at a fixed angle about perpendicular to the handle plane defined by the side arms. The ramp portions also form a predetermined acute angle with said abutment plane for a purpose to be hereinafter explained.

The concave structure of the abutment segment is shaped to effectively engage bottle neck 24. Preferably, it's shape is a section from a circle having a diameter that corresponds to the circular diameter of the bottle neck.

It will also be appreciated that at least the abutment means and hinge means should be constructed of a material that is less resilient or flexible than the bottle neck and/or overcap 25. In this way, the snap-set of the clamping action will be enhanced and a firm frictional neck/overcap engagement will occur.

Rotatably connected to the hinge means is a bottle neck engagement means comprising a neck ring 50. A portion of the ring is positioned directly below the abutment means to enable an overlapping contact therewith. The ring has a flared U-shape in plan view and is preferably constructed of a bent rod material that is flexible relative to the abutment means.

The neck ring comprises an arcuate neck section 52. Preferably, the neck section is semi-circular in plan shape with a diameter that is about equal to or slightly larger than the diameter of bottle neck 24. This permits its close engagement with the bottle neck and/or overcap.

Each opposing side of the neck ring merges into an elbow 54 from which extends a pivot arm 56. The elbow comprises the apex of an obtuse angle "c" between the neck section and pivot arms. It functions as a flex joint which expands during the intermediate part of the clamping movement.

As viewed in FIGS. 1-2, each of the pivot arms incline upwardly from their respective joints to a distal free end 60,61. At each end there is provided a connector means for rotatable engagement with the aforementioned hinge means 18.

With reference to FIGS. 1-3, the connector means at first end 60 comprises a downturned hook part 62 which extends through a respective eyelet 39 of the hinge means. At second end 61, the connector means comprises an outwardly extending pivot shaft 64. The shaft is sized to extend through the corresponding hinge means eyelet. It comprises a short straight rod section that projects outwardly about perpendicular from the pivot arm 56.

To facilitate assembly and permit the interchange of different sizes and shapes of neck engagement means, it is desirable to construct the neck ring with a flexible material. In this way, the elbow will be inherently flexible and the pivot arms can be flexed toward each other. Having flexibility will allow reduced spacing between the distal ends and permit insertion of the ends into the eyelets.

Figure 5:
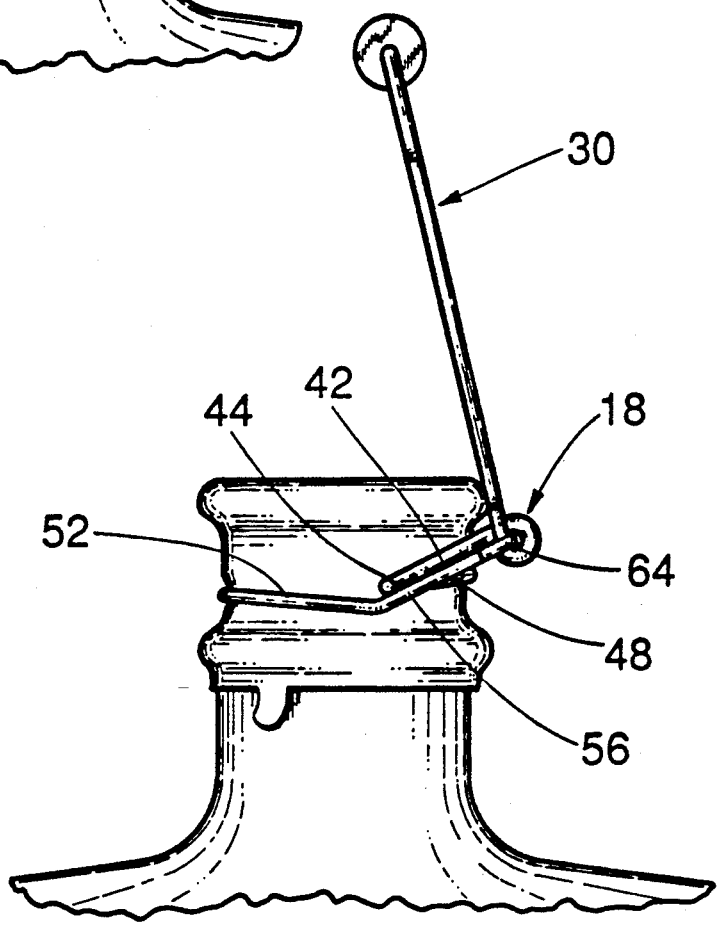
FIG. 5 is a side elevational view similar to FIG. 4 with the device in a clamped position.

During assembly, the hook part 62 is rotated endwise into engagement with its corresponding eyelet. The straight pivot shaft can then be deflected inwardly, aligned with its corresponding eyelet and released to spring outwardly into engagement with the eyelet. The ring will now be able to swing freely from a down or clamped position, as shown in FIG. 5, to a horizontal or open position in alignment with the arms. If desired for storage, compact packaging, or the like, the ring can rotate further to a reversed position over the top of the abutment means.

When applied to a bottle neck, the ring will be in the open position with the abutment means aligned about vertically. In this way, the neck ring can be placed over the neck without obstruction.

Figure 4:
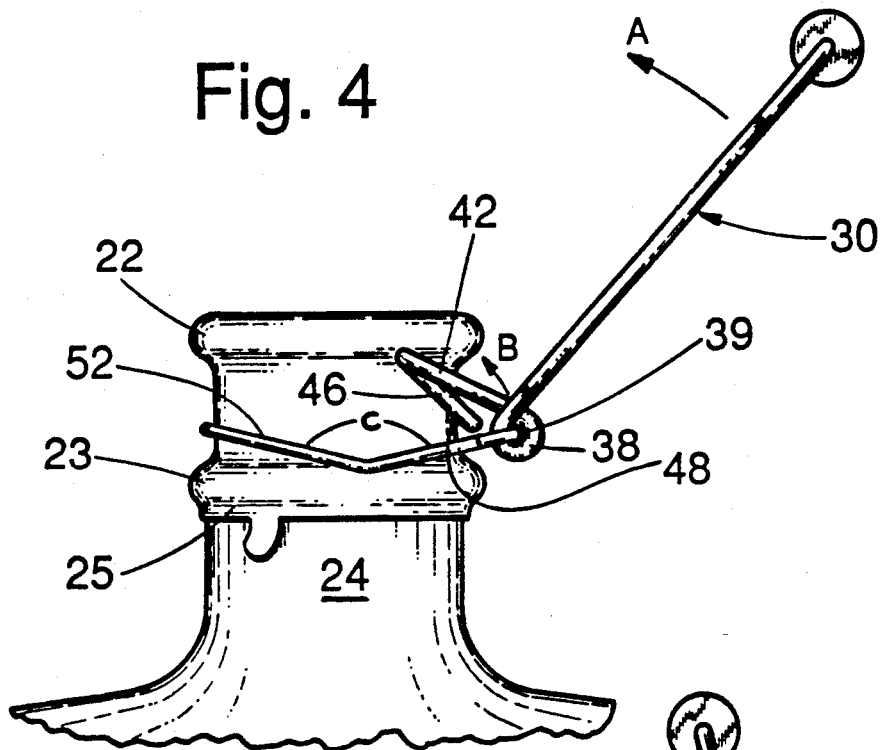
FIG. 4 is a side elevational view of the device of FIG. 1 as it is being clamped to a bottle neck and cap.

In FIGS. 4-5, the neck portion of a five gallon water bottle is illustrated. Typically, the neck structure of such bottles is provided with a peripheral lip flange 22 that extends circumferentially around the bottle opening. A neck flange 23 is also shown spaced-apart at a vertically lower area of the neck. Both flanges are rounded and extend coextensively outwardly and peripherally about the bottle neck.

When the bottle is filled, the contents may be sealed with a plastic covering such as overcap 25. The clamp of the invention is adaptable for engagement of the bottle neck, with or without the overcap. If the bottle neck is constructed of a nonresilient material, such as glass, the plastic overcap facilitates a frictional engagement by becoming indented from the clamping force. This is shown in FIG. 5 of the drawings. If the bottle neck is a different diameter, the neck ring can be exchanged to accommodate the different diameter as hereinabove described.

With the neck ring in the open position, it is placed loosely over the bottle neck/overcap and between the lip and neck flanges. In this position, the neck section will engage one side of the bottle neck and the abutment means will be disposed to engage the opposite side.

As shown by arrow A in FIG. 4, handle means 14 is rotated toward the bottle neck. This action simultaneously rotates the abutment means 16 inwardly toward the neck. At the intermediate point of rotation, when the plane of concave structure 46 is about perpendicular to the neck center axis, maximum force will be applied to the neck. Also, the neck ring and concave structure will be at their closest spacing. This intermediate position is unstable because the neck ring and concave structure are freely hinged together without restriction for further rotation. Also, the hinge connection is offset outwardly from the pivot area 48 of contact between the concave structure and bottle neck.

The above arrangement creates two offset pivot points whereby further movement will result in orbital movement of the hinge means about the pivot area (arrow B) simultaneous with rotation of the handle means about the hinge means. Due to the instability of two offset points of rotation, the assembly will seek a level of lowest force. As such, it will continue its dual rotational movement until stopped by the concave structure impinging upon the pivot arms 56. This is shown in FIG. 5 and is denoted as the abutment means down or clamped position As mentioned previously, it is desirable that the shortest spacing (diameter) between the neck ring section and concave structure closely approximate the bottle neck diameter. If the spacing is less, the elbow 54 will remain flexed even when clamped in the down position. This may help in maintaining a clamped position.

If the spacing is greater than the neck diameter, but less than the lip flange 22, the ring section and concave structure will slide up the neck during lifting and engage the neck. As such, it can be seen that a predetermined clamp opening will always be formed. This will occur without regard to the need for gravity securement resulting from lifting the bottle.

While the invention has been described with respect to preferred embodiments, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. A clamp for a water bottle neck comprising:
   a lever comprising a handle means with opposing side arms joined at a hinge means with an abutment means, said abutment means comprising an abutment segment extending about perpendicular from said handle means;
   a neck engagement means comprising a neck section having opposing sides which extend to a respective joint and form an obtuse angle with a respective pivot arm, each of said pivot arms being located beneath said abutment segment to provide an engagement with said abutment segment when said segment is rotated downwardly.

2. The clamp of claim 1 wherein said abutment segment comprises opposing ramp portions which flare outwardly from said hinge means to respective corner portions.

3. The clamp of claim 2 wherein said corner portions are spacedapart a distance greater than the distance between said pivot arms.

4. The clamp of claim 3 including a concave structure extending inwardly between said corner portions.

5. The clamp of claim 1 wherein said hinge means comprises a curled portion at an end of each of said side arms, said curled portion forming an eyelet for rotatable connection with a corresponding pivot arm.

6. The clamp of claim 5 wherein said abutment segment includes a concave structure that is horizontally spaced-apart from said eyelet.

7. The clamp of claim 5 wherein said neck engagement means is flexible and each of said pivot arms includes a connector means comprising a hook end for one of said arms and a straight outwardly extending pivot shaft for the other one of said arms.

8. The clamp of claim 1 wherein said abutment segment includes a concave structure which is horizontally offset from said hinge means.

9. The clamp of claim 8 wherein said neck section and concave structure define an opening having a diameter about equal to the diameter of said bottle neck when said clamp is in a down position.

10. A clamping assembly for a bottle neck comprising:
  an abutment segment joined to a handle means by a hinge means, said abutment segment including a concave structure forming an abutment plane that intersects about perpendicularly with a handle plane formed by said handle means, said concave structure being horizontally spaced-apart from said hinge means; and,
  a neck ring comprising a neck section with opposing inclined pivot arms connected to said hinge means, said arms being spacedapart a distance less than said abutment segment whereby said arms will provide a predetermined rotational stop defining a down position for said abutment segment.

11. The assembly of claim 10 wherein said neck section and concave structure define a predetermined opening having a minimum spacing about equal to the diameter of said bottle neck.

12. The assembly of claim 11 whereby said concave structure and neck section engage said bottle neck on opposite sides of said neck and said concave structure engagement with said neck forming a pivot area on said neck about which said hinge means orbits during clamping movement of said handle means.

13. A clamping device for securement to a bottle neck comprising:
  a rod formed into a handle bar having opposing ends;
  said rod forming handle side arms by extending downwardly and inwardly from each opposing end to a curled portion formed by about a three-quarter turn of said rod, each of said curled portions defining a hinge means;
  said rod flaring outwardly from each curled portion into a corner portion from which said bar curves backward to merge into a concave structure horizontally offset from said hinge means; and,
  a neck ring vertically offset below said corner portion for engagement with said neck opposite said concave structure, each opposing side of said ring merging into an elbow from which extends a respective pivot arm, the distal end of each arm having connector means for rotatable engagement with a respective hinge means, said neck ring and concave structure defining a substantially circular neck engagement area when said device is engaged with said bottle neck.

14. The device of claim 13 wherein said rod is substantially inflexible and said neck ring and pivot arms are flexible.

15. The device of claim 13 wherein said corner portions are spaced-apart a distance greater than said pivot arms.

* * * * *